US006572011B1

(12) United States Patent
Allman et al.

(10) Patent No.: US 6,572,011 B1
(45) Date of Patent: Jun. 3, 2003

(54) BACKLIT DISPLAY APPARATUS

(75) Inventors: Andrew J. Allman, Bridgeton, MO (US); James E. Burton, Fenton, MO (US)

(73) Assignee: AMS Controls, Inc., Maryland Heights, MO (US)

( * ) Notice: Subject to any disclaimer, the term of this patent is extended or adjusted under 35 U.S.C. 154(b) by 0 days.

(21) Appl. No.: 09/396,499

(22) Filed: Sep. 13, 1999

(51) Int. Cl.$^{7}$ ................................................ G06F 17/00
(52) U.S. Cl. ........................................ 235/375; 235/454
(58) Field of Search ................................ 235/375, 454, 235/470; 40/518

(56) References Cited

U.S. PATENT DOCUMENTS 1,308,698 A 7/1919 Craig
1,310,688 A 7/1919 Carpenter
2,754,605 A 7/1956 Berkeley
3,120,066 A 2/1964 Reeves
3,334,432 A 8/1967 Bates et al.
3,426,461 A 2/1969 Miller
3,510,973 A 5/1970 Mazzocco, Sr.
3,605,301 A 9/1971 Jacquot et al.
3,616,554 A 11/1971 Singer et al.
3,780,458 A 12/1973 Jacoby et al.
3,822,493 A 7/1974 Maley
3,829,997 A 8/1974 Singer
3,839,808 A 10/1974 Singer
3,925,918 A 12/1975 Pelin
4,020,576 A 5/1977 Dickey
4,041,626 A 8/1977 Ellis et al.
4,073,581 A 2/1978 Rayburn
4,080,637 A * 3/1978 Chase et al. ................ 235/449
4,083,136 A 4/1978 Zalenko
4,090,315 A 5/1978 Brown, Jr. et al.
4,136,472 A 1/1979 Delvo
4,176,483 A 12/1979 Bailey
4,203,094 A 5/1980 Sowa et al.
4,255,889 A 3/1981 Logan
4,437,248 A 3/1984 Ramme
4,510,708 A 4/1985 Pokrinchak
4,680,883 A 7/1987 Stadjuhar et al.
4,694,597 A 9/1987 Kuei-Wen
4,694,600 A 9/1987 Murray
4,709,493 A 12/1987 Sapp
4,773,176 A 9/1988 Grehan
4,964,066 A * 10/1990 Yamane et al. ............. 235/454
4,965,947 A 10/1990 Zanetti (List continued on next page.)

FOREIGN PATENT DOCUMENTS

DE 29721222 U1 2/1998

*Primary Examiner*—Harold I. Pitts
(74) *Attorney, Agent, or Firm*—Senniger, Powers, Leavitt & Roedel

(57) ABSTRACT

A backlit display apparatus illuminates a film for displaying one or more images. The film has a series of frames and at least one mark printed on it corresponding to each frame. The marks provide information representative of frame position relative to the film or otherwise identifying the image displayed by the frame when illuminated. A light source, positioned behind the film relative to an intended viewer in front of the film, illuminates the frames. A detector detects the marks printed on the film as the film is advanced by a motor. An encoder associated with the motor detects the position of the frames as a function of the angular position of the motor when each mark on the film is detected. In response, the encoder generates a position signal representative of the detected positions of the frames. A processor controls the motor in response to the position signal to advance the film so that a selected frame is within the desired viewing area for a predetermined interval of time. The processor also provides a universal interface to other display apparatus or external devices.

31 Claims, 9 Drawing Sheets

U.S. PATENT DOCUMENTS

| | | | | | |
|---|---|---|---|---|---|
| 4,972,068 | A | * | 11/1990 | Ohtani et al. | 235/454 |
| 4,995,183 | A | | 2/1991 | Aiken, Sr. | |
| 5,003,717 | A | | 4/1991 | Trame et al. | |
| 5,016,371 | A | | 5/1991 | Aiken | |
| 5,101,587 | A | | 4/1992 | Toraby-Payhan | |
| 5,125,176 | A | | 6/1992 | Toraby-Payhan | |
| 5,142,892 | A | | 9/1992 | Noé et al. | |
| 5,174,055 | A | | 12/1992 | Aiken | |
| 5,218,673 | A | * | 6/1993 | Fujiwara | 235/454 |
| 5,237,156 | A | * | 8/1993 | Konishi | 235/454 |
| 5,347,735 | A | | 9/1994 | Pratt | |
| 5,389,993 | A | | 2/1995 | Adolphi et al. | |
| 5,392,549 | A | | 2/1995 | Castro | |
| 5,410,330 | A | | 4/1995 | Simpson et al. | |
| 5,410,830 | A | | 5/1995 | Aiken, Sr. | |
| 5,412,892 | A | | 5/1995 | Filippakis | |
| 5,412,893 | A | | 5/1995 | Aiken, Sr. | |
| 5,488,791 | A | | 2/1996 | Boni | |
| 5,493,802 | A | | 2/1996 | Simson | |
| 5,515,631 | A | | 5/1996 | Nardy et al. | |
| 5,517,778 | A | | 5/1996 | Simson | |
| 5,555,657 | A | | 9/1996 | Sorbini | |
| 5,597,994 | A | * | 1/1997 | Hornun | 235/375 |
| 5,598,651 | A | | 2/1997 | Aiken et al. | |
| 5,673,504 | A | | 10/1997 | Brown | |
| 5,678,333 | A | | 10/1997 | Aiken, Sr. | |
| 5,687,498 | A | | 11/1997 | Keyser et al. | |
| 5,729,252 | A | * | 3/1998 | Fraser | 235/470 |
| 5,755,050 | A | | 5/1998 | Aiken | |
| 5,787,620 | A | | 8/1998 | Swanson et al. | |
| 5,791,755 | A | | 8/1998 | Henry et al. | |
| 5,809,677 | A | | 9/1998 | Wamser et al. | |

* cited by examiner

BACKLIT DISPLAY APPARATUS

BACKGROUND OF THE INVENTION

The invention generally relates to display apparatus and, particularly, to a backlit motion display apparatus for displaying a series of advertisements or other images in a predetermined manner.

In general, backlit displays, especially those which scroll from one image to another, provide effective advertising in a reliable, user-friendly, multi-image format. A conventional scrolling display apparatus uses a backlit light box, free standing on a pedestal or mounted on a wall, that displays several different images in a single sign. The images are typically printed in frames on a flexible polyester film that is wound on a scrolling spool system. Often, the spool system advances the film scroll for displaying each frame for a predetermined amount of time. Such a display usually advances the frames consecutively in one scroll direction and then in the other or in a single direction and then rewinds the film.

Presently available motion displays use marks to indicate, for example, the centers of the frames. However, centering and other kinds of marks are first printed on tape and then adhered to the surface of the film. This is because typical mark reading devices reflect light off of the tape to detect the marks and conventional film materials are not well suited for reflecting light in this manner. In addition to adding a labor-intensive production step, the tape tends to slip over time and, thus, introduces positioning errors. Moreover, a sticky residue is left on the surface of the film as a result of the slippage. This residue attracts dirt and interferes with mark detection.

Further, motion displays presently use an open loop control scheme for advancing and positioning the frames. Such open loop systems rely on, for example, a time-base only and do not determine the position of the scroll. These open loop motion displays typically run at full speed for a portion of a velocity profile and then shift to a much slower speed while hunting for a centering mark. Due to variations in film length and mass, friction and motor torque, these motion displays must spend almost half of the velocity profile in a slow speed in order to avoid overshooting the centering mark. As a result, presently available motion displays using open loop control schemes fail to provide a desired level of efficiency.

For these reasons, a backlit motion display is desired providing accurate, reliable, closed loop control and which permits printing centering marks, end marks and/or bar codes directly on the film.

Often, an advertiser wishes to provide prospective customers with not only visual displays but also accompanying jingles, additional information, discounts, store directions or the like in connection with the advertisement to enhance its effectiveness. Unfortunately, presently available motion displays are not well suited for these types of enhancements. For this reason, a backlit display providing a convenient and flexible interface to other devices, such as coupon printers, sound controllers and other peripherals is desired.

SUMMARY OF THE INVENTION

The invention meets the above needs and overcomes the deficiencies of the prior art by providing an improved backlit display apparatus. Among the several objects and features of the present invention may be noted the provision of such display apparatus that permits convenient interfacing with peripherals; the provision of such display apparatus that permits accurate and reliable mark detection; the provision of such display apparatus that permits accurate and reliable closed loop position, speed and frame sequence control; and the provision of such display apparatus that is economically feasible and commercially practical.

A backlit display apparatus embodying aspects of the invention includes a film supported on a motor-driven spool. The spool has at least a portion of the film wound on it and is positioned so that at least another portion of the film is in front of a light source and within a desired viewing area. The film has a series of frames and at least one mark printed on it corresponding to each frame. The marks provide information representative of frame position relative to the film. The light source, positioned behind the film relative to an intended viewer in front of the film, illuminates the frames. When illuminated, each frame displays an image printed on the film. The apparatus also includes a detector for detecting the marks printed on the film as the film is advanced by the motor. An encoder associated with the motor detects the position of the frames as a function of the angular position of the motor when each mark on the film is detected. In response, the encoder generates a position signal representative of the detected positions of the frames. The apparatus further includes a processor receiving and responsive to the position signal from the encoder for controlling the motor to advance the film so that a selected frame is within the desired viewing area for a predetermined interval of time.

In another embodiment, a backlit display apparatus includes a film having a frame and at least one mark printed on it corresponding to the frame. The mark provides information identifying an image printed on the film. A light source, positioned behind the film relative to an intended viewer in front of the film, illuminates the frame. When illuminated within a desired viewing area, the frame displays an image printed on the film. The apparatus also includes a detector for detecting the mark printed on the film and a processor responsive to the detector for identifying the image being displayed and generating a signal representative of the identification. In turn, a peripheral, receiving and responsive to the identification signal from the processor, provides multimedia enhancements to the displayed image.

Alternatively, the invention may comprise various other methods and systems.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF PREFERRED EMBODIMENTS

Figure 1:
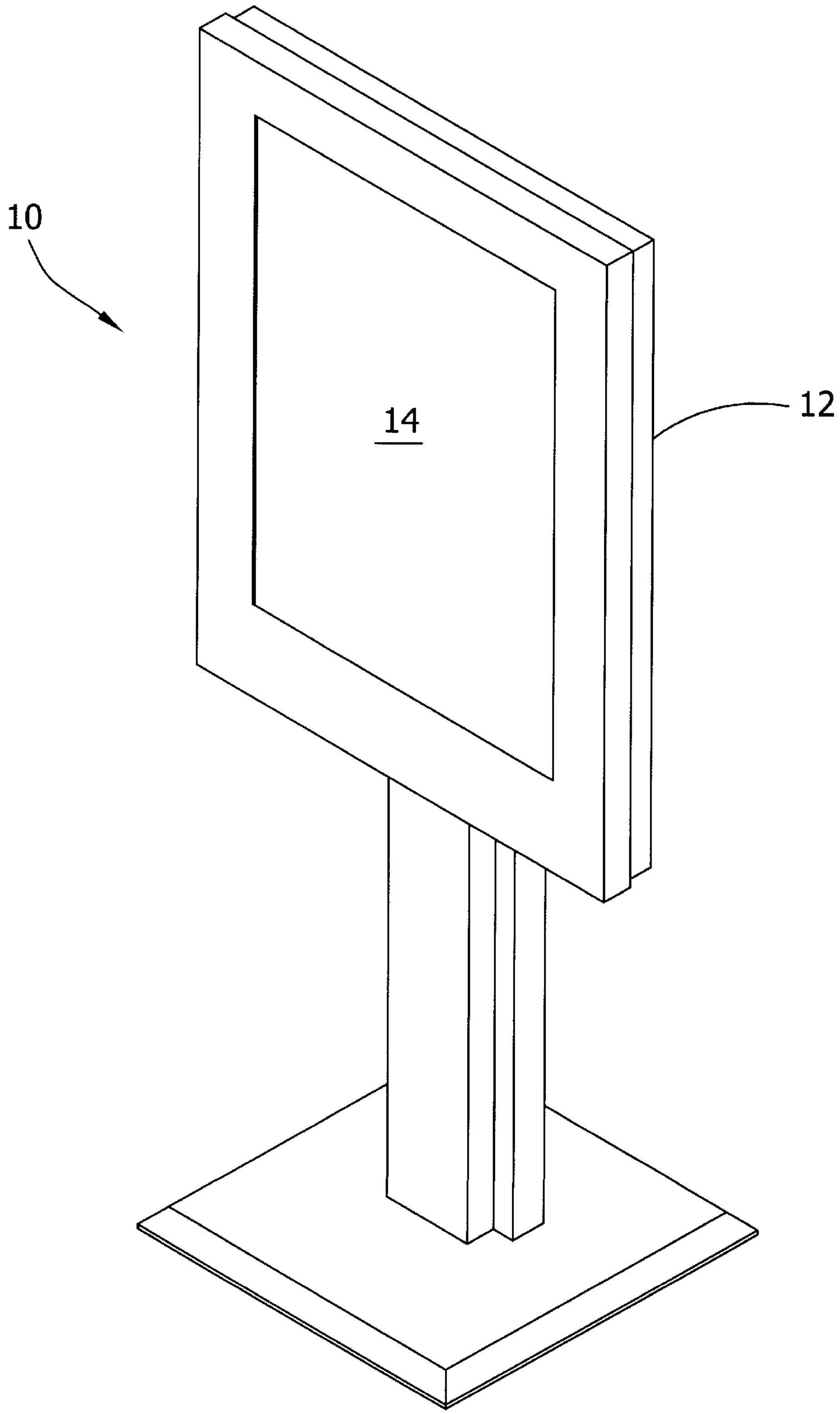
FIG. 1 is a perspective view of a backlit display apparatus according to a preferred embodiment of the invention.
Figure 2:
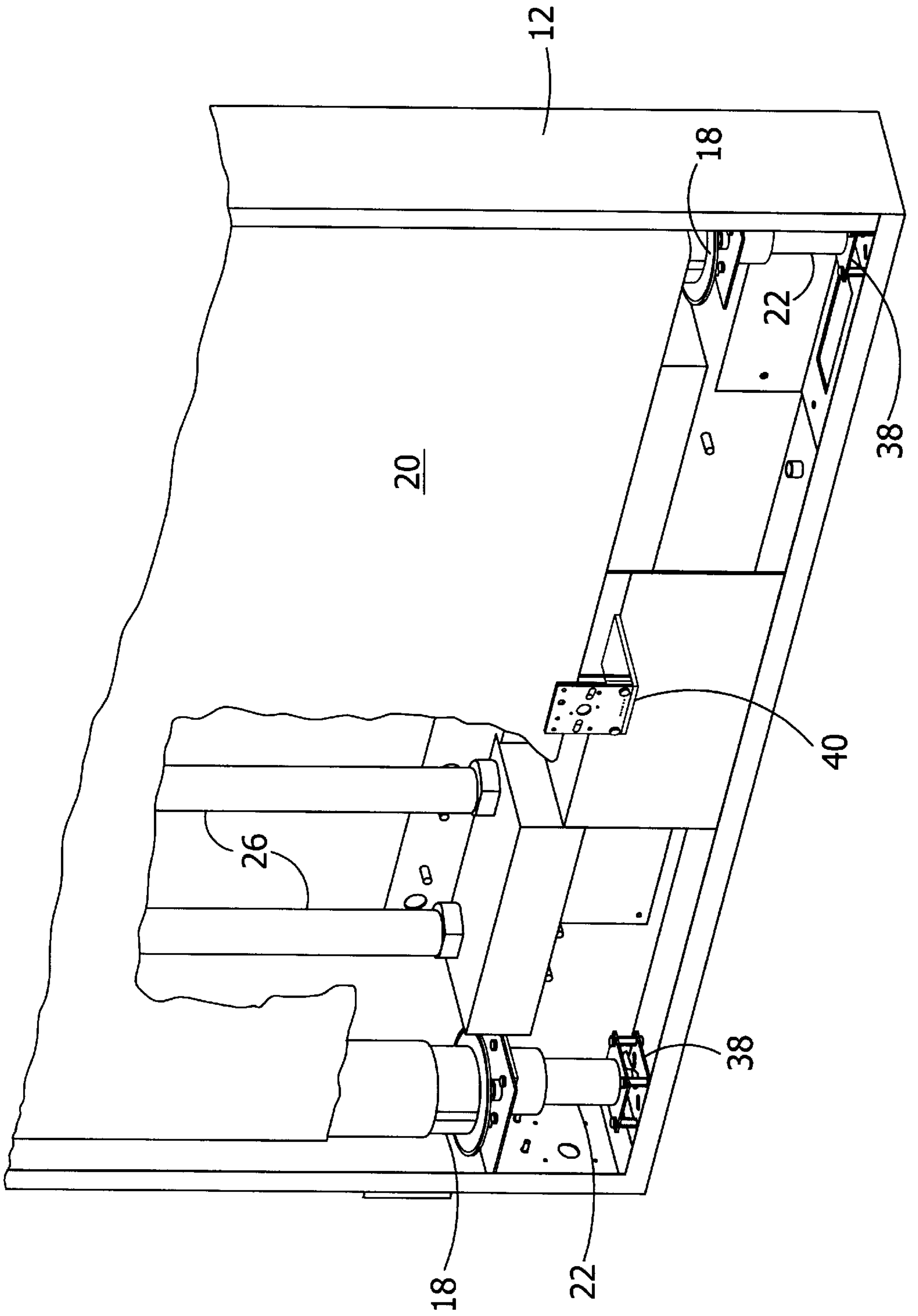
FIG. 2 is an enlarged, fragmentary view of the apparatus of FIG. 1.

Referring now to the drawings, FIG. 1 illustrates a backlit display apparatus, indicated generally at reference character 10, for providing a scrolling motion display. The display apparatus 10 has a housing 12 with a window 14. FIG. 2 is a fragmentary view of the housing 12, having portions broken away to illustrate the interior housing 12. As shown in FIG. 2, housing 12 encloses a pair of removable spools 18 on which a film 20 is wound to form a scroll (the spools 18 are often referred to as scrolls or scroll tubes). In addition, housing 12 encloses a motor 22 for driving each spool 18 to advance the film 20 in a desired direction. A light source 26 inside housing 12 provides backlighting to film 20. In this embodiment, the light source 26 includes four spaced apart flourescent light tubes. The window 14 is generally opposite light source 26 and defines a desired viewing area, a portion of film 20 being held between window 14 and light source 26 for viewing.

Figure 3:
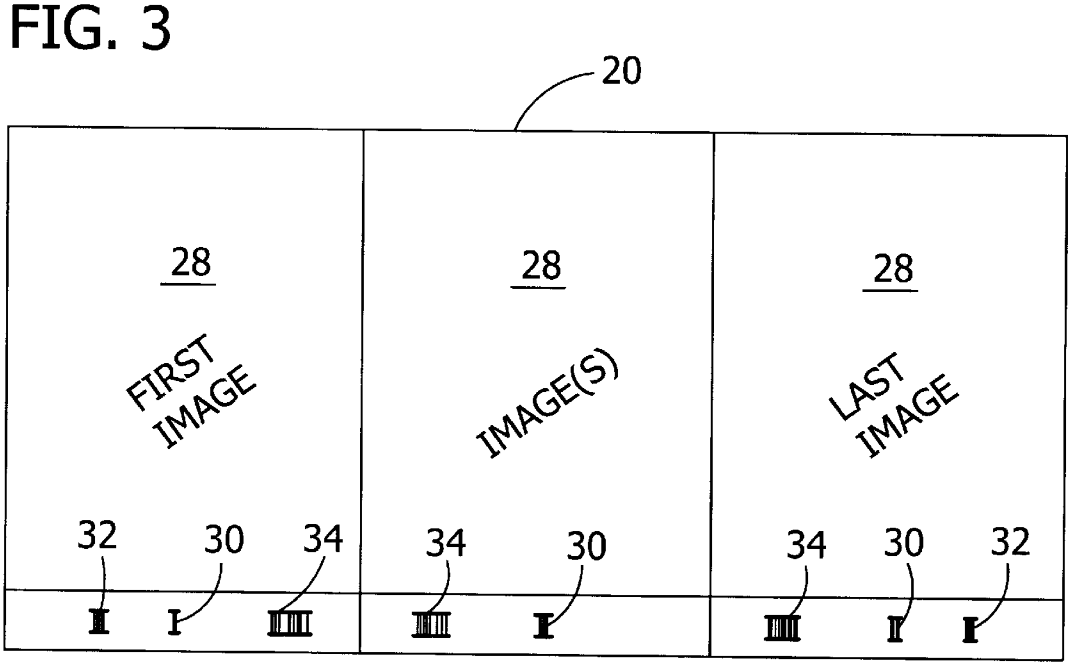
FIG. 3 is a diagrammatic view of a film for display on the apparatus of FIG. 1.

As shown in FIG. 3, film 20 is preferably a flexible, elongate, translucent film having a series of discrete frames 28, the size of each corresponding to the size of window 14. Although only three frames 28 are shown for convenience, it is contemplated that film 20 includes several frames 28 (e.g., up to 20 or more frames 28). Those skilled in the art recognize that the image of each frame 28 can be individually printed and spliced together to form film 20 or printed as one continuous film 20. The maximum capacity of the scroll depends on the thickness of film 20 and the type of printing process used.

In the illustrated embodiment, film 20 includes marks 30, 32 and 34 printed directly on film 20 outside the viewing area defined by window 14. At least one of the marks 30, 32, 34 corresponds to each frame 28. Among other things, marks 30, 32, 34 provide information representative of the position of the particular frame 28 relative to film 20. For example, each mark 30 indicates the center of its corresponding frame 28. Additional marks 32 indicates the ends of film 20 (i.e., the first and last frame 28 of film 20). According to the invention, marks 32 are different in size than marks 30. For example, marks 32 are twice as wide as marks 30. This permits distinguishing one type of mark from another. In yet another embodiment of the invention, marks 34 printed on film 20 comprise bar codes representative of information identifying frames 28, either by position in the series, content of the image or the like.

Referring again to FIG. 2, light source 26 is positioned behind film 20 relative to an intended viewer in front of film 20 for illuminating frames 28. Advantageously, frames 28 each display an image printed on film 20 when illuminated. The spools 18 support film 20 and, at any given time, at least a portion of film 20 is wound on one of the spools 18. The scroll formed by film 20 and spools 18 is positioned within housing 12 so that another portion of film 20 is in front of light source 26 and within the desired viewing area defined by window 14.

According to the invention, backlit display apparatus 10 also includes an encoder 38 associated with each motor 22 for detecting the position of frames 28 as a function of the angular position of the respective motor 22. A detector 40 detects marks 30, 32, 34 printed on film 20 as motor 22 advances film 20. The encoder 38 preferably cooperates with the detector 40 by generating a position signal representative of the detected positions of frames 28 when each mark 30, 32 and/or 34 on film 20 is detected. A universal motion controller 44 (see FIG. 7), receives the position signal from encoder 38 and controls motor 22 in response thereto for advancing film 20 so that a selected frame 28 is within the desired viewing area for a predetermined interval of time.

Figure 4:
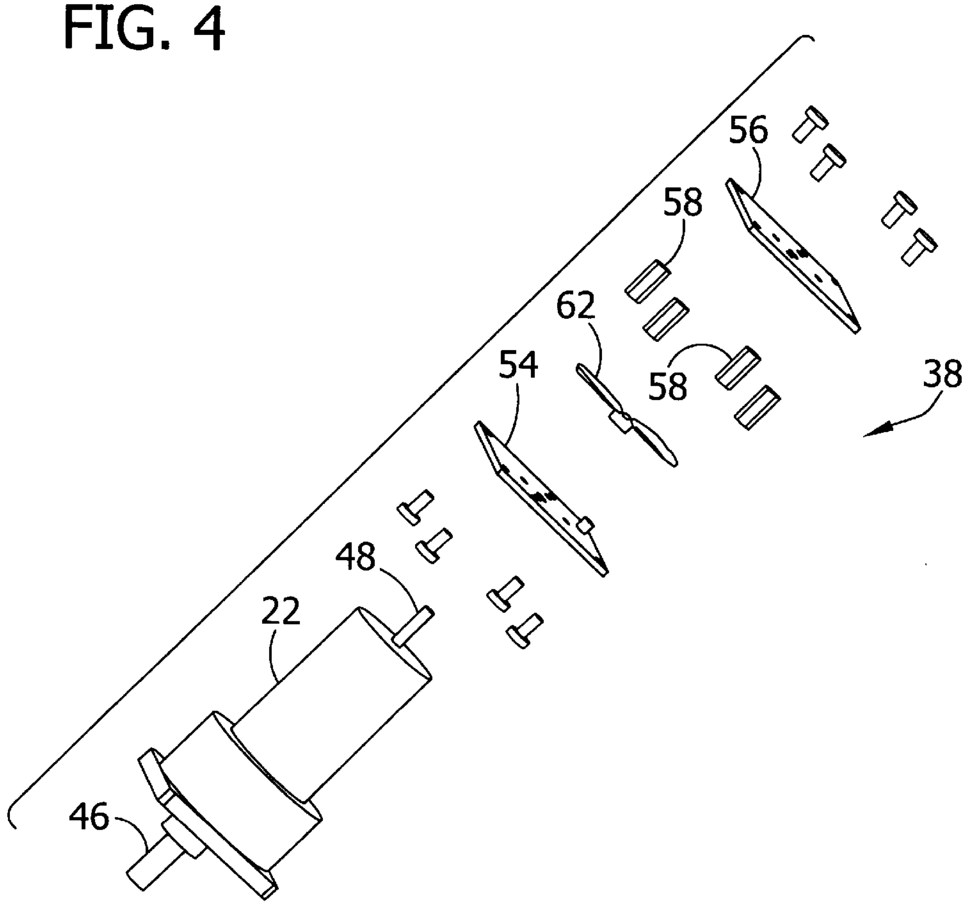
FIG. 4 is an exploded perspective view of a motor and encoder assembly of the apparatus of FIG. 1.

FIG. 4 is an exploded view of one of the motors 22 and its associated encoder 38. It is to be understood that both motors 22 and encoders 38 are substantially identical in this embodiment. As shown in FIG. 5, motor 22 includes a primary, or drive, shaft 46 for driving the respective spool 18 and a secondary, or encoder, shaft 48, for use with the respective encoder 38. Motor 22 is, for example, a 24V DC gearmotor, which is a DC brush motor with an integral spur gearhead. A 24V relay connects each motor 22 to a corresponding pulse width modulation (PWM) drive circuit 52 (see FIG. 7) or shorts out the motor's windings. For example, when power is removed from the universal motion controller 44, the relay shorts together the windings of each motor 22 to keep frames 28 from sagging.

Encoder 38 preferably has a pair of printed circuit boards 54, 56 spaced apart by spacers 58. In the illustrated embodiment, the encoder shaft 48 passes through the printed circuit boards 54, 56 and has a butterfly-shaped encoder blade 62 mounted on shaft 48 between boards 54, 56. A pair of infrared (IR) diodes 64 located on printed circuit board 54 provide an IR beam to corresponding phototransistors 66 located on printed circuit board 56 opposite the IR diodes 64. As motor 22 rotates drive shaft 46, encoder shaft 48 also rotates. This causes the encoder blade 62 to rotate and, thus, break the IR beams from diodes 64 as a function of the rotational speed of shaft 48. As a result of encoder blade 62 spinning, the two phototransistors 66 produce a series of pulses. Each pulse corresponds to a known distance of rotation (i.e., encoder resolution).

Figure 5A:
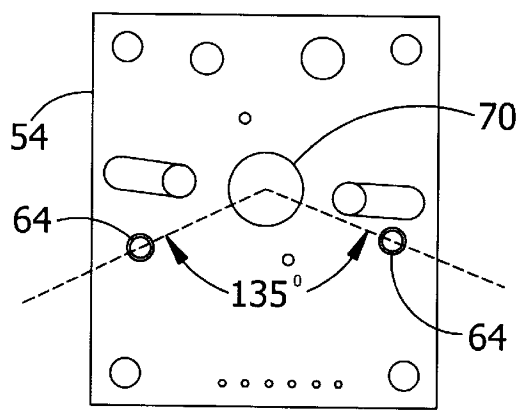
FIGS. 5A and 5B are plan views of printed circuit boards of the motor and encoder assembly of FIG. 4.
Figure 5B:
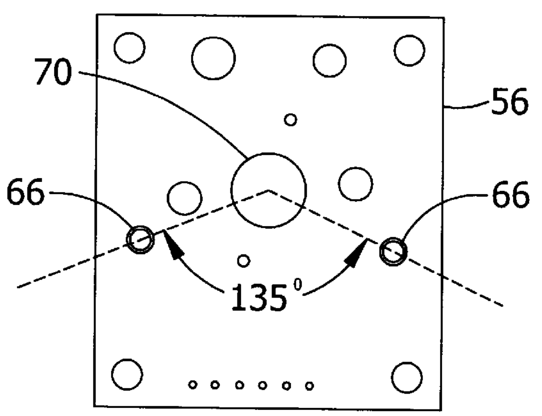

Referring now to FIGS. 5A and 5B, IR diodes 64 are preferably located on printed circuit board 54 approximately 135° apart relative to an opening 70 adapted to receive shaft 48. It is to be understood that phototransistors 66 are similarly positioned on printed circuit board 56. By comparing the phasing of the two channels (i.e., the pulse signals from the two phototransistors 66), the direction of rotation can also be determined. By tying these signals directly to an interrupt input on a microcontroller 72 (see FIG. 7), which is part of the universal motion controller 44, the present invention prevents lost counts.

Figure 6:
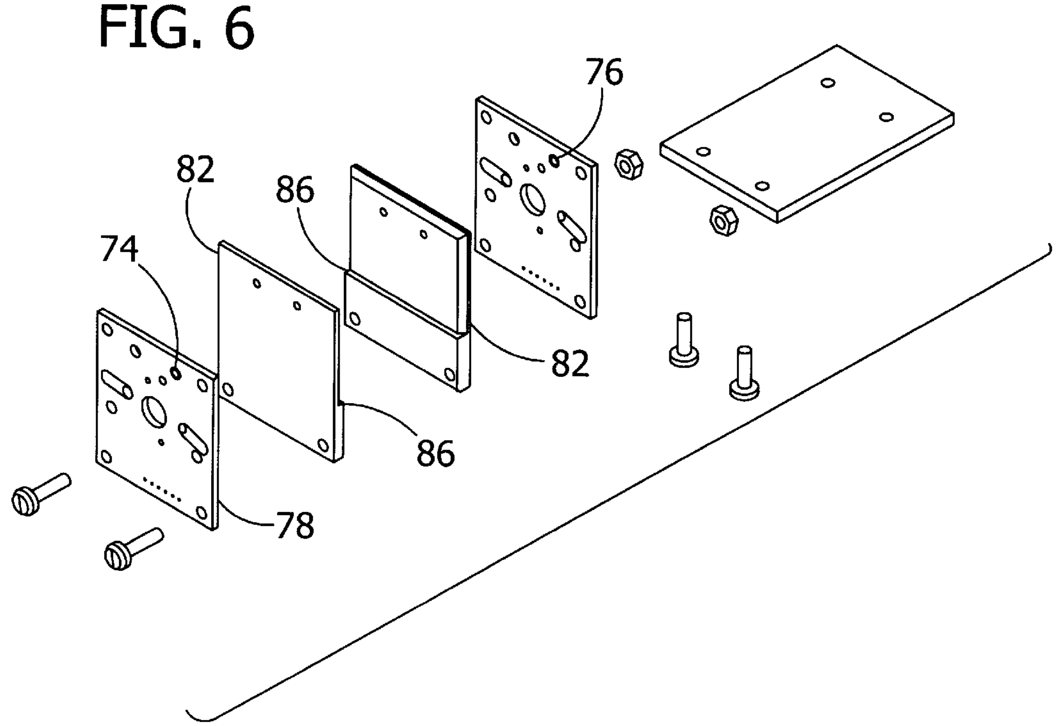
FIG. 6 is an exploded perspective view of a laser detector assembly of the apparatus of FIG. 1.

FIG. 6 is an exploded view of detector 40. In a preferred embodiment of the present invention, detector 40 is a photodetector circuit having a laser transmitter 74 positioned on one side of film 20 for transmitting laser light through film 20 and a receiver 76 positioned on the other side of film

20 for receiving the transmitted laser light. In this instance, a visible-light laser diode located on a printed circuit board 78 embodies the laser transmitter 74. Sharp manufactures a suitable laser diode as part number GH06507A2B0. The receiver 76 is preferably a phototransistor located on a printed circuit board 80 generally opposite laser transmitter 74. Sharp also manufactures a suitable phototransistor as part number PT501.

In the illustrated embodiment, a pair of nylon film guides 82 separate the printed circuit boards 78, 80. Each of the guides 82 preferably has a shoulder 86 for providing a channel through which the bottom edge of film 20 travels as motors 22 advance film 20. Centering marks 30, end of film marks 32 and bar codes 34 are printed on the bottom of each frame 28, outside the viewing area, so that they pass in between laser transmitter 74 and receiver 76 in the channel defined by film guides 82. Laser transmitter 74 pulses at a duty cycle low enough to remain safe and to prevent the laser light beam from burning film 20. Marks 30, 32, 34 printed on film 20 substantially block the laser light transmitted by laser transmitter 74 from passing through film 20 to receiver 76. By tuning the photodetector circuitry to read marks 30, 32, 34 printed directly on film 20, significant labor savings over conventional mark detection systems is available.

Figure 7:
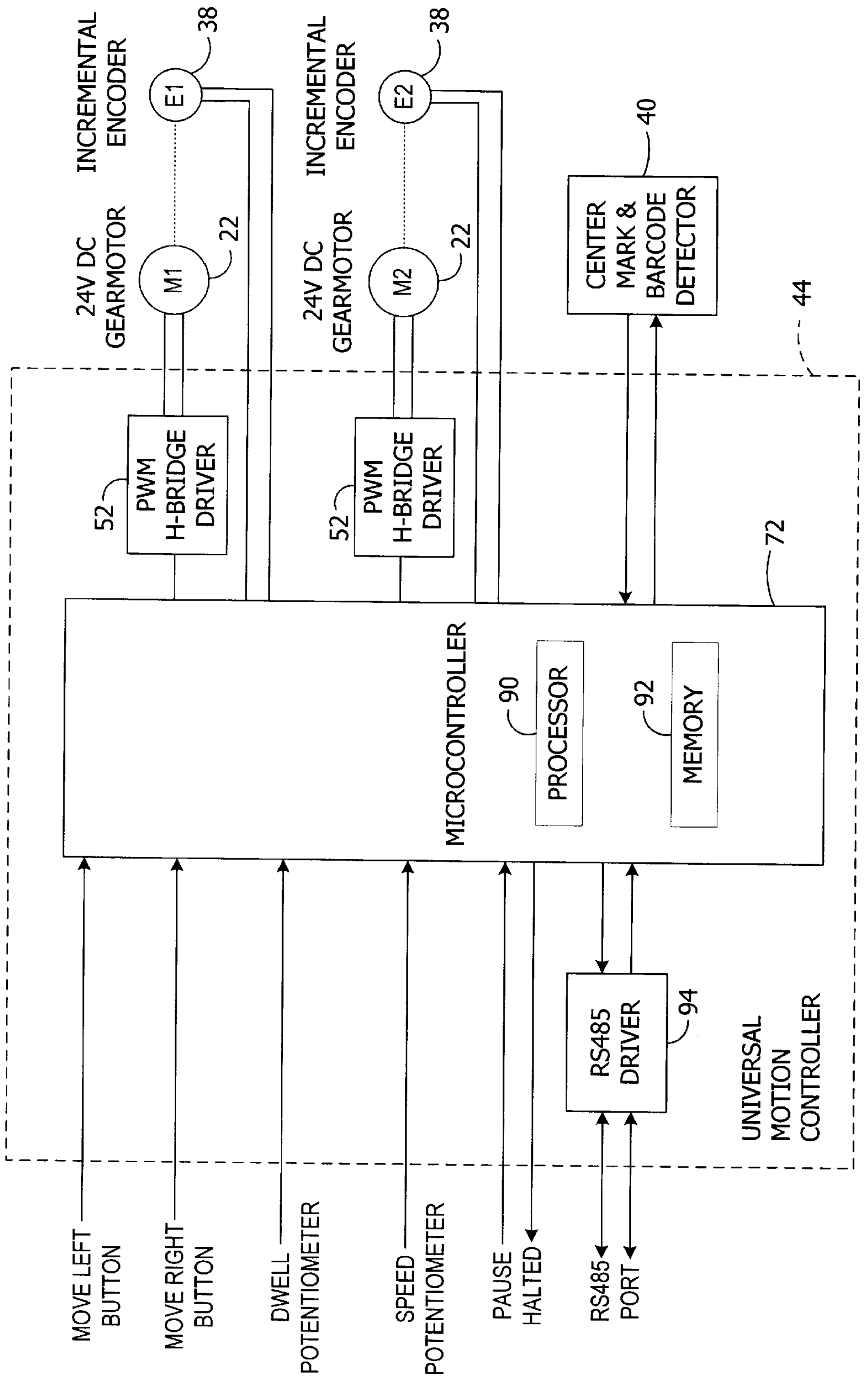
FIG. 7 is a block diagram of a controller of the apparatus of FIG. 1.

FIG. 7 illustrates control aspects of display apparatus 10 in block diagram form. As shown, motion controller 44 includes the microcontroller 72 for executing a closed loop control routine and enabling an interface to various peripherals. Preferably, microcontroller 72 is an integrated circuit chip having a high-speed microprocessor 90 and a memory 92. Microchip Technology Inc. manufactures suitable microcontrollers as part number PIC16C73 and PIC16C76.

In this embodiment, the memory 92 includes both RAM and EPROM storage. Microcontroller 72 also provides digital input/output ports, analog/digital inputs, timers and a serial port (e.g., an RS485 interface). An RS485 driver 94 connected to microcontroller 72 provides a two-wire RS485 port for serial communications (half duplex). Preferably, display apparatus 10 is a slave device on the RS485 bus, responding to commands from another device but never initiating communications.

The motion controller 44 provides manual control of display apparatus 10 via inputs to microcontroller 72. In a preferred embodiment of the invention, microcontroller 72 has a Move Left Button input for manually advancing film 20 by one frame 28 to the left and a Move Right Button input for manually advancing film 20 by one frame 28 to the right. In both instances, the display preferably moves immediately when an operator presses either button. Microcontroller 72 also permits the operator to program the display parameters. For example, a Dwell Potentiometer input allows the operator to set how long display apparatus 10 displays each frame 28 (i.e., the display interval) and a Speed Potentiometer input allows the operator to set how fast display apparatus 10 moves between frames 28.

According to the invention, microcontroller 72 has a PAUSE input and a HALTED output for use in synchronizing the display to other similar display apparatus. A logic level high PAUSE input prevents display apparatus 10 from automatically advancing. If either motor 22 is moving when the PAUSE signal goes high, it will complete the current move. On the other hand, display apparatus 10 automatically scrolls to the next frame 28 in the series when the PAUSE signal goes low.

The microcontroller 72 outputs a logic level high HALTED signal when display apparatus 10 is halted. This can then be communicated to peripherals (i.e., other display apparatus or devices) for synchronizing the display with the other displays or devices.

FIG. 7 also shows the PWM H-bridge drive circuits 52 for driving motors 22 in response to PWM signals provided by microcontroller 72. In a preferred embodiment of the invention, each drive circuit 52 is a power integrated circuit (e.g., an Allegro A3953SB) and accepts a PWM signal from microcontroller 72 for determining the velocity and direction of the respective motor 22. For example, a 50% duty cycle stops the respective motor 22 while duty cycles greater than 50% drive it in a forward direction and duty cycles less than 50% drive it in a reverse direction. As described above, incremental encoder 38 provides position and speed feedback for its respective motor 22. Microcontroller 72 preferably executes a closed loop control scheme for generating the PWM drive signals based on the encoder feedback. A suitable closed loop control system uses the gain term of a PID (proportional, integral, derivative) control algorithm.

Figure 8:
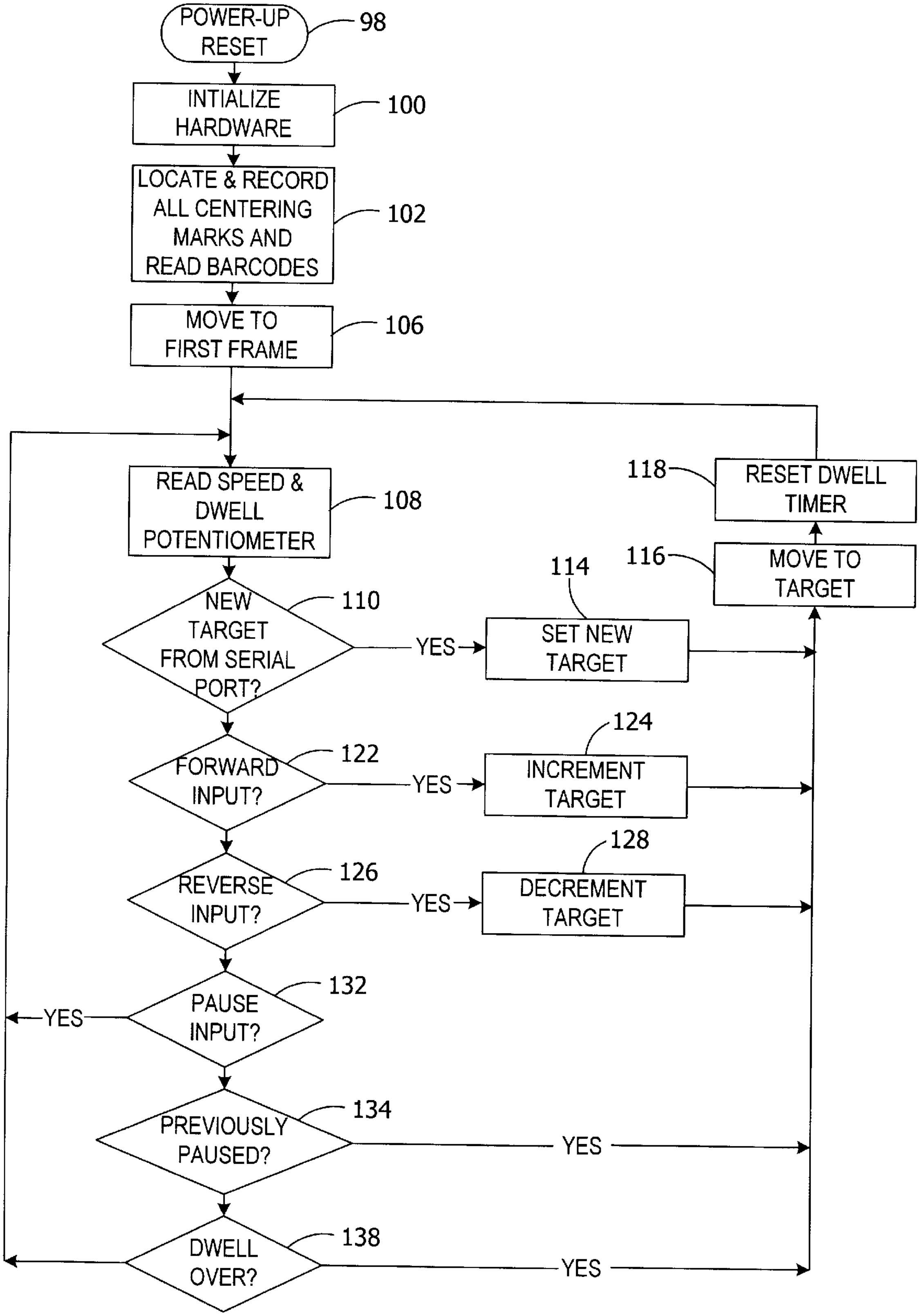
FIG. 8 is a flow diagram illustrating the operation of the controller of FIG. 7.

FIG. 8 illustrates the operation of motion controller 44 in flow diagram form. The processor 90 of microcontroller 72 preferably executes routines stored in memory 92 to implement the operation of display apparatus 10. After a power-up and reset step 98, controller 44 proceeds to execute an initialization routine beginning at step 100. At step 100, controller 44 initializes the hardware of apparatus 10 (e.g., microcontroller 72). This includes the timers, I/O pins, pulse width modulator (PWM) and serial port. During initialization, the timers set prescalers so that the timer interrupt occurs on the proper time base. The I/O pins are preferably pre-defined as either a digital input or output. Some pins can also be analog inputs. In this embodiment, the initialization routine sets the PWM base frequency for controlling the direction and velocity of motors 22 to 20 kHz. The particular operating parameters of motors 22 determine the desired base frequency. For example, a 24V gearmnotor such as motor 22 is particularly well suited for operating with a PWM base frequency between 20 kHz and 30 kHz. With respect to the serial port of microcontroller 72, step 100 initializes the baud rate, data bits, stop bits and parity.

Proceeding to step 102, detector 40 detects each of the marks 30, 32, 34 while motors 22 scroll through the series of frames 28. Memory 92 stores the information represented by the detected mark in connection with position data from encoder 38. Proceeding to step 106, controller 44 causes motors 22 to return film 20 to its first frame 28.

Step 108 begins a routine for acquiring target information. At step 108, motion controller 44 reads the speed and dwell time settings input by the operator. As described above, these parameters define the interval of time that a particular frame 28 will be displayed and the speed at which motors 22 advance film 20 between frames 28. Proceeding to step 110, controller 44 determines if a new target frame 28 has been received via the RS485 serial port. If so, controller 44 sets the new target at step 114 and then causes motors 22 to advance film 20 to the new target frame 28 at step 116. At step 118, motion controller 44 resets the dwell timer for timing the predetermined display interval and then returns to step 108.

On the other hand, if a new target was not received from the serial port, controller 44 continues at step 122 to determine if a forward input is present. Depending on the orientation of display apparatus 10 and a predefined sequence of frames 28, forward frame movement may be a move to the left or to the right or may be a move up or down.

If controller 44 receives a forward input, it increments the target frame 28 at step 124. In other words, controller 44 commands movement to the next frame 28 in the series of frames 28. Proceeding to step 116, controller 44 causes motors 22 to advance film 20 to the target frame 28. As before, controller 44 resets the dwell timer at step 118 before returning to step 108. If controller 44 did not receive a forward input, it continues at step 126 to determine if a reverse input is present. If so, controller 44 decrements the target frame 28 at step 128. In other words, controller 44 commands movement back to the previous frame 28 in the series of frames 28. Proceeding to step 116, controller 44 causes motors 22 to advance film 20 in the opposite direction (i.e., to move back) to the target frame 28. As before, controller 44 resets the dwell timer at step 118 before returning to step 108.

If neither a forward input nor a reverse input is present at microcontroller 72, motion controller 44 determines the presence of a PAUSE input at step 132. In this instance, a PAUSE input causes motion controller 44 to return to step 108 because it prevents the further movement of film 20. If a PAUSE input is not present, however, controller 44 proceeds to step 134 to determine if display apparatus 10 was previously paused. If so, controller 44 causes motors 22 to complete the current move to the target frame 28 at step 116 followed by steps 118 and 108. If not, controller 44 examines the dwell period at step 138. Following step 138, motion controller 44 operates in a manner similar to the steps described above. If the dwell period expired at step 138, controller 44 causes motors 22 to automatically move to the target frame 28 at step 116 followed by steps 118 and 108. In this instance, the target is the next frame 28 in the series. If the dwell period has not expired, controller 44 simply returns to step 108.

Referring now to FIGS. 9–14, universal motion controller 44 provides a flexible, universal interface to a variety of peripherals such as other display apparatus or external devices. For example, the interface implemented by motion controller 44 synchronizes the motion of display apparatus 10 to other displays, accepts movement commands and provides information about the current status of the display.

Figure 9:
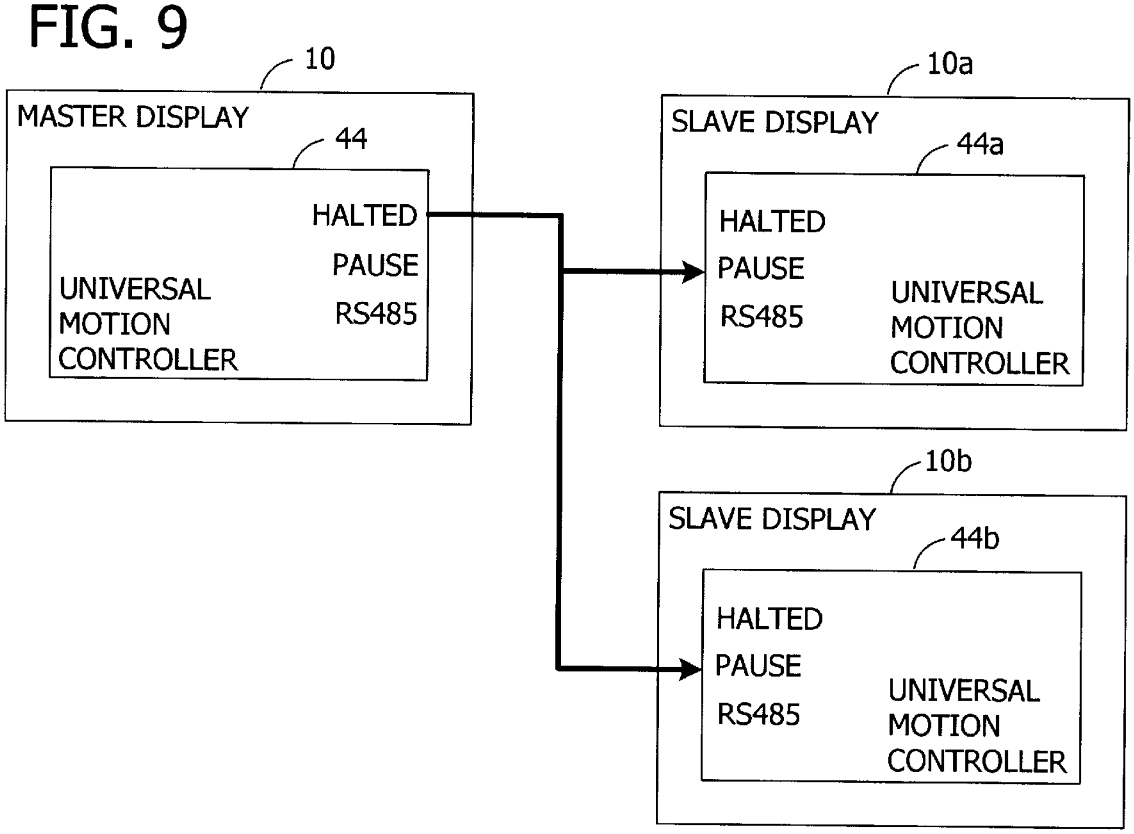
FIG. 9 is a block diagram illustrating an interface between the controller of FIG. 7 and other display apparatus.

In FIG. 9, motion controller 44 of display apparatus 10 synchronizes the displays of a plurality of other motion displays, shown as display apparatus 10*a*, 10*b*. In this embodiment, the other display apparatus 10*a*, 10*b* have universal motion controllers 44*a*, 44*b*, respectively, but no optional hardware is required to implement this setup. One or more slave motion displays 10*a*, 10*b* can be configured to follow the movement of master motion display 10.

In operation, the motion controller 44 of master display 10 outputs a HALTED command, which is wired to a PAUSE input of one or more slave displays 10*a*, 10*b*. When master display 10 starts to move to the next frame 28, the HALTED output changes from high to low, removing the PAUSE input and causing slave displays 10*a*, 10*b* to advance their films substantially in unison.

Figure 10:
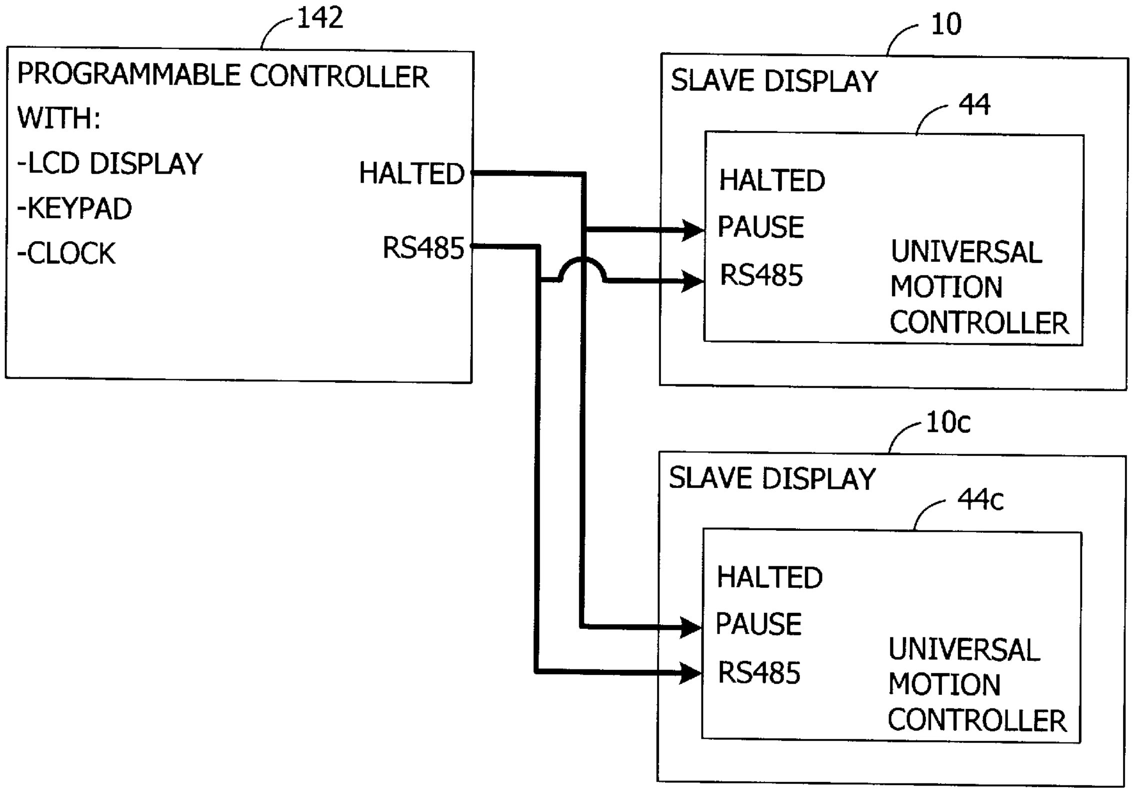
FIG. 10 is a block diagram illustrating an interface between a remote programmable controller and the controller of FIG. 7 and other display apparatus.

FIG. 10 illustrates a remote programmable controller 142 that coordinates the motion of one or more motion displays. In this instance, motion display apparatus 10 constitutes a slave display to the remote controller 142. Controller 142 preferably controls one or more other slave displays, shown as display apparatus 10*c*, which includes universal motion controller 44*c*. According to a preferred embodiment of the invention, remote controller 142 has an LCD display and a keypad for programming. Controller 142 also includes a clock so that displays 10, 10*c* can be programmed to display particular frames 28 or series of frames 28 based on the time of day or day of week.

In operation, the remote programmable controller 142 decides when it is time for each display 10, 10*c* to move to a selected frame 28. Controller 142 first transmits a new target frame to each display 10, 10*c* via an RS485 interface. It then sets a HALTED output low. This removes a PAUSE input from controllers 44, 44*c* and, thus, causes all of the displays to move at once. It is contemplated that controller 142 may also have multiple outputs that can be used if the displays are not desired to move in unison.

Figure 11:
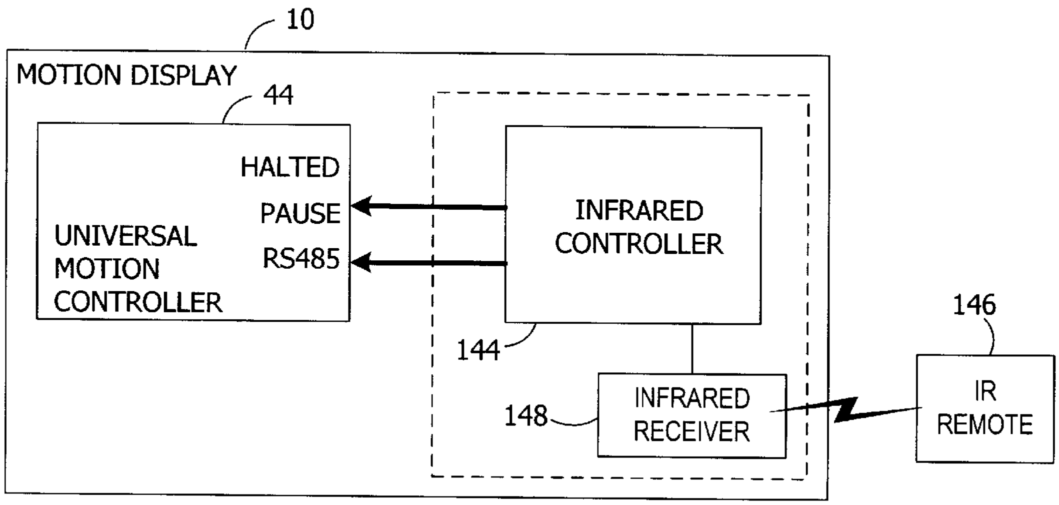
FIG. 11 is a block diagram illustrating an interface between the controller of FIG. 7 and an infrared remote controller.

Referring now to FIG. 11, one embodiment of motion display apparatus 10 includes an IR controller 144 for permitting an operator to manually control motors 22 to advance film 20 as desired. The operator inputs commands via an IR remote 146. In turn, an IR receiver 148 associated with the IR controller 144 receives the signals from the IR remote 146. Infrared controller 144 then communicates the received signals to universal motion controller 44. As an example of the remote operation of display apparatus 10, IR controller 144 provides a PAUSE input to motion controller 44. When the operator enters a new frame number (or a next/previous command) via IR remote 146, the IR receiver 148 receives the command and IR controller 144 interprets it. Infrared controller 144 then transmits information regarding a new target frame 28 to the motion controller 44 of display apparatus 10 via an RS485 interface. Once the new target is sent, IR controller 144 toggles the PAUSE input on motion controller 44 as often as needed to cause motors 22 to advance film 20 to the programmed target frame 28.

Figure 12:
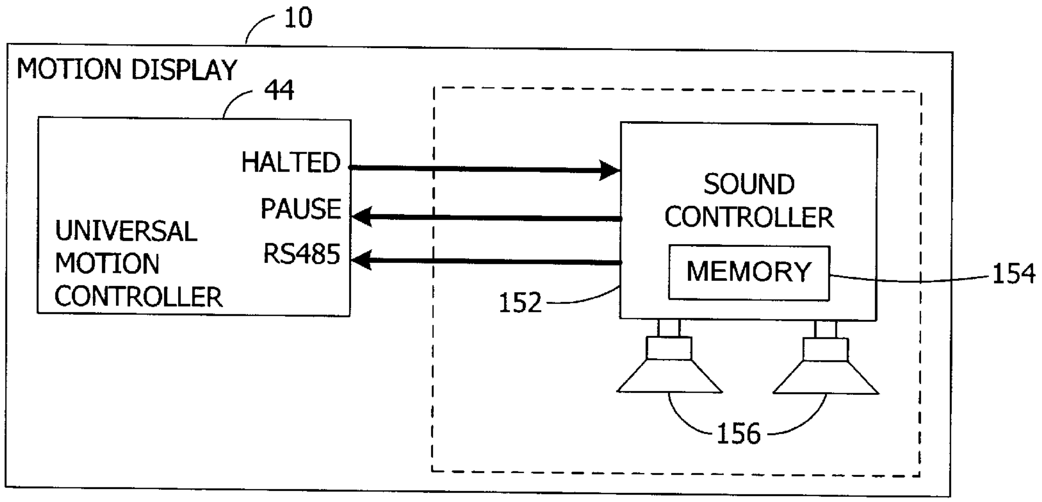
FIG. 12 is a block diagram illustrating an interface between the controller of FIG. 7 and a sound controller.

FIG. 12 illustrates a peripheral sound controller 152 for use with display apparatus 10. According to the invention, the sound controller 152 includes a memory 154 storing a plurality of sound files representing different prerecorded sound tracks. Preferably, the tracks correspond to frames 28 so that a particular track can be played on speakers 156 for each of the displayed frames 28. It is contemplated to download the sound files into the memory 154 of sound controller 152 from a personal computer (not shown). Sound controller 152 plays the sound files based on either the current number of frame 28 within the sequence of frames 28 or based on bar code information read for each frame 28.

In operation, sound controller 152 monitors the HALTED output of motion controller 44. When display apparatus 10 has finished a move, as evidenced by, for example, a low-to-high transition on the HALTED output, sound controller 152 requests the number of frame 28 or a bar code value for the image currently being displayed. This data determine which sound track to play. While the sound track is playing, sound controller 152 pauses motion controller 44 to prevent it from advancing film 20. When the sound track is finished, however, sound controller 152 removes the PAUSE input from motion controller 44 and allows motors 22 to advance film 20 to the next frame 28.

Figure 13:
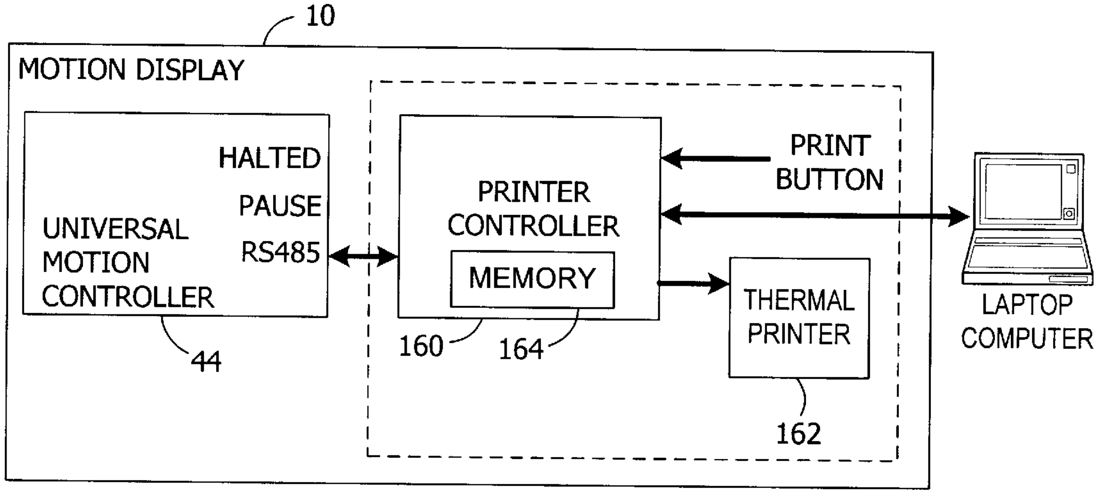
FIG. 13 is a block diagram illustrating an interface between the controller of FIG. 7 and a printer controller.

Referring now to FIG. 13, display apparatus 10 also provides a flexible interface for a printer controller 160. This permits the use of a printer 162, such as a thermal printer, for printing material related to the displayed images. For example, the printed material may include coupons, mail-in forms, product data, maps and the like related to a vendor's products or services shown in the displayed image. In a preferred embodiment, printer controller 160 stores a plurality of print images in a memory 164. The stored print images correspond to frames 28 so that a particular print image may be printed for each of the displayed frames 28.

The motion display apparatus 10 preferably includes a print button or the like for receiving a manual print command from a customer. When the customer presses the print button, printer controller 160 queries motion controller 44 to determine either the number of the frame 28 being displayed or bar code data for the current image. This data identifies which of the stored print images is to be printed by thermal printer 162 in connection with the displayed image. In one embodiment, the print images are downloaded from a personal computer 166 via a serial connection. This same serial connection can also be used to upload logged data representing the print requests (i.e., what information was requested by customers and when did they make such requests).

Figure 14:
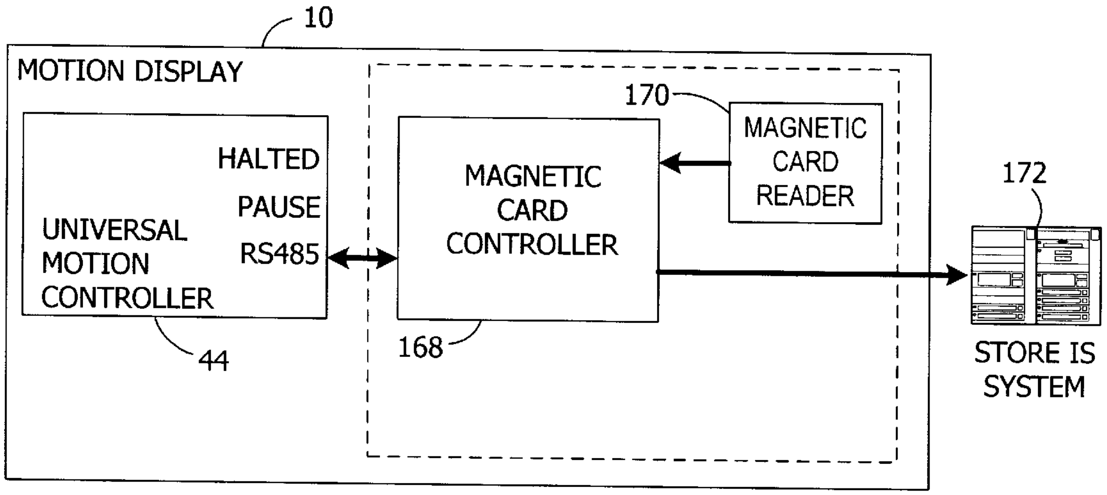
FIG. 14 is a block diagram illustrating an interface between the controller of FIG. 7 and a magnetic card controller.

FIG. 14 illustrates a magnetic card controller 168 for use with display apparatus 10. In this embodiment, the magnetic card controller 168 records customer requests for information, discounts and the like on the particular products or services shown in the displayed image. For example, the requested discount can be in the form of a "paperless coupon." To make such a request, the customer swipes a magnetic card through a magnetic card reader 170 associated with controller 168. Magnetic card controller 168 then queries motion controller 44 via an RS485 interface to determine either the number of selected frame 28 in the series of frames 28 or bar code data for the current image. For each request, magnetic card controller 168 receives customer information read from the magnetic card by the reader 170 and forwards the information to an external database, such as a store computer system 172. In addition, magnetic card controller receives and forwards the information from motion controller 44 identifying the selected frame 28.

Although the present invention is described primarily with respect to a motion display apparatus, it is contemplated that features of the invention, particularly those related to the flexible interface for use with various peripheral devices, may also be applied to a static display apparatus.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A backlit display apparatus comprising:

a film including a series of frames, said film further including at least one mark printed thereon corresponding to each frame, said marks providing information representative of frame position relative to the film;

a light source for illuminating the frames, said light source being positioned behind the film relative to an intended viewer in front of the film, said frames each displaying an image printed on the film when illuminated;

a spool for supporting the film, said spool having at least a portion of the film wound thereon and being positioned so that at least another portion of the film is in front of the light source and within a desired viewing area;

a motor for rotating the spool to advance the film;

a detector for detecting the marks printed on the film as the film is advanced by the motor;

an encoder associated with the motor for detecting the position of the frames as a function of the angular position of the motor when each mark on the film is detected, said encoder generating a position signal representative of the detected positions of the frames; and a processor receiving and responsive to the position signal from the encoder for controlling the motor to advance the film so that a selected frame is within the desired viewing area for a predetermined interval of time.

2. The apparatus of claim 1 wherein the processor executes a closed loop control routine for controlling the motor to position the selected frame within the viewing area.

3. The apparatus of claim 1 wherein the processor is programmable to control a frame speed parameter and/or a dwell time parameter.

4. The apparatus of claim 1 wherein the processor executes an initialization routine for controlling the motor to scroll through the series of frames and further comprising a memory associated with the processor for storing the detected positions of the frames.

5. The apparatus of claim 1 further comprising a memory associated with the processor storing a table of display data, said display data including the predetermined interval of time for viewing each frame.

6. The apparatus of claim 1 wherein the marks printed on the film indicate the centers of the frames.

7. The apparatus of claim 1 wherein one of the marks printed on the film indicates an end of the film.

8. The apparatus of claim 1 wherein the marks printed on the film comprise bar codes representative of information identifying the frames.

9. The apparatus of claim 1 wherein the mark is printed on the film outside the viewing area.

10. The apparatus of claim 1 wherein the detector for detecting the marks printed on the film comprises a photodetector circuit having a laser transmitter positioned on one side of the film for transmitting laser light-through the film and a receiver positioned on the other side of the film for receiving the transmitted laser light.

11. The apparatus of claim 10 wherein the marks printed on the film substantially block the laser light from being transmitted through the film.

12. The apparatus of claim 1 wherein the processor comprises a universal interface for communicating with a peripheral, said peripheral receiving and responsive to communication via the interface.

13. The apparatus of claim 1 further comprising a sound controller responsive to the processor for playing a prerecorded sound track corresponding to the displayed image of the selected frame only when the selected frame is within the viewing area.

14. The apparatus of claim 13 wherein the sound controller includes a memory storing a plurality of prerecorded sound-tracks and receives a signal from the processor identifying which of the stored sound tracks is to be played for the displayed image.

15. The apparatus of claim 1 further comprising a printer for printing a print image on paper corresponding to the displayed image of the selected frame when the selected frame is within the viewing area.

16. The apparatus of claim 15 further comprising a printer controller associated with the printer, said printer controller having a memory storing a plurality of print images and receiving a signal from the processor identifying which of the stored print images is to be printed for the displayed image.

17. The apparatus of claim 15 wherein the print image comprises a coupon.

18. The apparatus of claim 1 further comprising a remote control for manually controlling the motor to advance the film so that the selected frame is within the viewing area.

19. The apparatus of claim 18 wherein the remote control is an infrared remote and further comprising an infrared receiver.associated with the processor for receiving infrared signals from the remote control.

20. The apparatus of claim 1 further comprising:

a magnetic card reader for reading information from a magnetic card; and a magnetic card controller associated with the reader, said magnetic card controller receiving the information from the magnetic card and receiving further information from the processor corresponding to the displayed image of the selected frame when the selected frame is within the viewing area, said magnetic card controller writing the information from the magnetic card and the processor to an external database.

21. The apparatus of claim 1 wherein the processor provides an interface to one or more additional backlit display apparatus, said additional backlit display apparatus each having a film on a spool and a motor for rotating the spool to advance the film, said processor generating a synchronizing signal for controlling the motor of each additional backlit display apparatus to advance the films substantially in unison.

22. The apparatus of claim 1 further comprising a housing enclosing the spool, film, motor and light source, said housing having a window generally opposite the light source, said window defining the viewing area, a portion of said film being held between the window and the light source for viewing.

23. The apparatus of claim 22 wherein the size of the frames corresponds to the size of the window.

24. The apparatus of claim 1 wherein the film comprises a flexible, elongate, translucent film having a series of discrete frames, each of the frames displaying an image printed on the film when illuminated.

25. A backlit display apparatus comprising:

a film including a frame and at least one mark printed thereon corresponding to the frame, said mark providing information identifying an image printed on the film;

a light source for illuminating the frame, said light source being positioned behind the film relative to an intended viewer in front of the film, said frame displaying the image printed on the film when illuminated within a desired viewing area;

a detector for detecting the mark printed on the film;

a processor responsive to the detector for identifying the image being displayed and generating a signal representative of the identification; and a peripheral receiving and responsive to the identification signal from the processor for providing multimedia enhancements to the displayed image.

26. The apparatus of claim 25 wherein the peripheral is a sound controller responsive to the processor for playing a prerecorded sound track corresponding to the displayed image when the frame is within the viewing area.

27. The apparatus of claim 26 wherein the sound controller includes a memory storing a plurality of prerecorded sound tracks and receives the identification signal from the processor identifying which of the stored sound tracks is to be played for the displayed image.

28. The apparatus of claim 25 wherein the peripheral is a printer controller and an associated printer for printing a print image on paper corresponding to the displayed image when the frame is within the viewing area.

29. The apparatus of claim 28 wherein the printer controller has a memory storing a plurality of print images and receiving the identification signal from the processor identifying which of the stored print images is to be printed for the displayed image.

30. The apparatus of claim 28 wherein the print image comprises a coupon.

31. The apparatus of claim 25 wherein the peripheral is a magnetic card controller and an associated reader for reading information from a magnetic card, said magnetic card controller receiving both the information from the magnetic card and the identification signal from the processor, said magnetic card controller writing the information from the magnetic card to an external database at a location corresponding to the displayed image when the frame is within the viewing area.

* * * * *